Sept. 5, 1967  D. E. WILCOX  3,339,419
ACCELEROMETER
Filed July 3, 1964  3 Sheets-Sheet 1

SENSING
AXIS

INVENTOR.
DOYLE E. WILCOX
BY Vincent H Cleary
ATTORNEY

Sept. 5, 1967  D. E. WILCOX  3,339,419
ACCELEROMETER

Filed July 2, 1964  3 Sheets-Sheet 2

INVENTOR.
DOYLE E. WILCOX
BY *Doyle H. Cleary*
ATTORNEY

Sept. 5, 1967    D. E. WILCOX    3,339,419
ACCELEROMETER

Filed July 2, 1964    3 Sheets-Sheet 3

INVENTOR.
DOYLE E. WILCOX
BY
ATTORNEY 3,339,419
ACCELEROMETER
Doyle E. Wilcox, Hacienda Heights, Calif., assignor to North American Aviation, Inc.
Filed July 2, 1964, Ser. No. 379,931
8 Claims. (Cl. 73—517)

This invention relates to accelerometers and more particularly to accelerometers utilizing cantilevered proof masses.

When employing a cantilevered proof mass, various types of mechanical hysteresis can result. This can result in substantial errors in the measurement of acceleration. One example is when relatively large forces occur that have a component parallel to contacting surfaces of the cantilever and its mount. These forces can result in permanent displacement of the cantilever relative to the mount. This conventionally results in misalignment of the proof mass and consequently erroneous output signals from the accelerometer.

Accordingly, an object of the invention is to provide an accelerometer having a cantilever proof mass with a minimum of mechanical hysteresis.

A further object of the invention is the provision of a proof mass mounting for a cantilevered proof mass wherein the effect of mechanical hysteresis is minimized.

A still further object of the invention is to provide an accelerometer utilizing a cantilevered proof mass wherein misalignment of the proof mass will be minimized.

Still another object of the invention is to provide an accelerometer that is compact and relatively small in size.

A still further object of the invention is the provision of an accelerometer utilizing a minimum of parts.

A feature of the present invention is an accelerometer having a proof mass mounting including a mounting base that is cantilevered from a support. A proof mass is cantilever mounted on the base extending toward the support. A capacitive pickoff is at both sides of the proof mass. Hence when the base is canted due to stress between the base and the support, the capacitance pickoff signal will not be effected. A further feature of the invention is an electromagnetic accelerometer wherein the pole pieces employed for an air gap are also utilized as capacitive pickoffs.

Other objects and advantages of the invention will become more apparent by reading of the following specification taken in connection with the accompanying drawings. Wherein.

Figure 2:
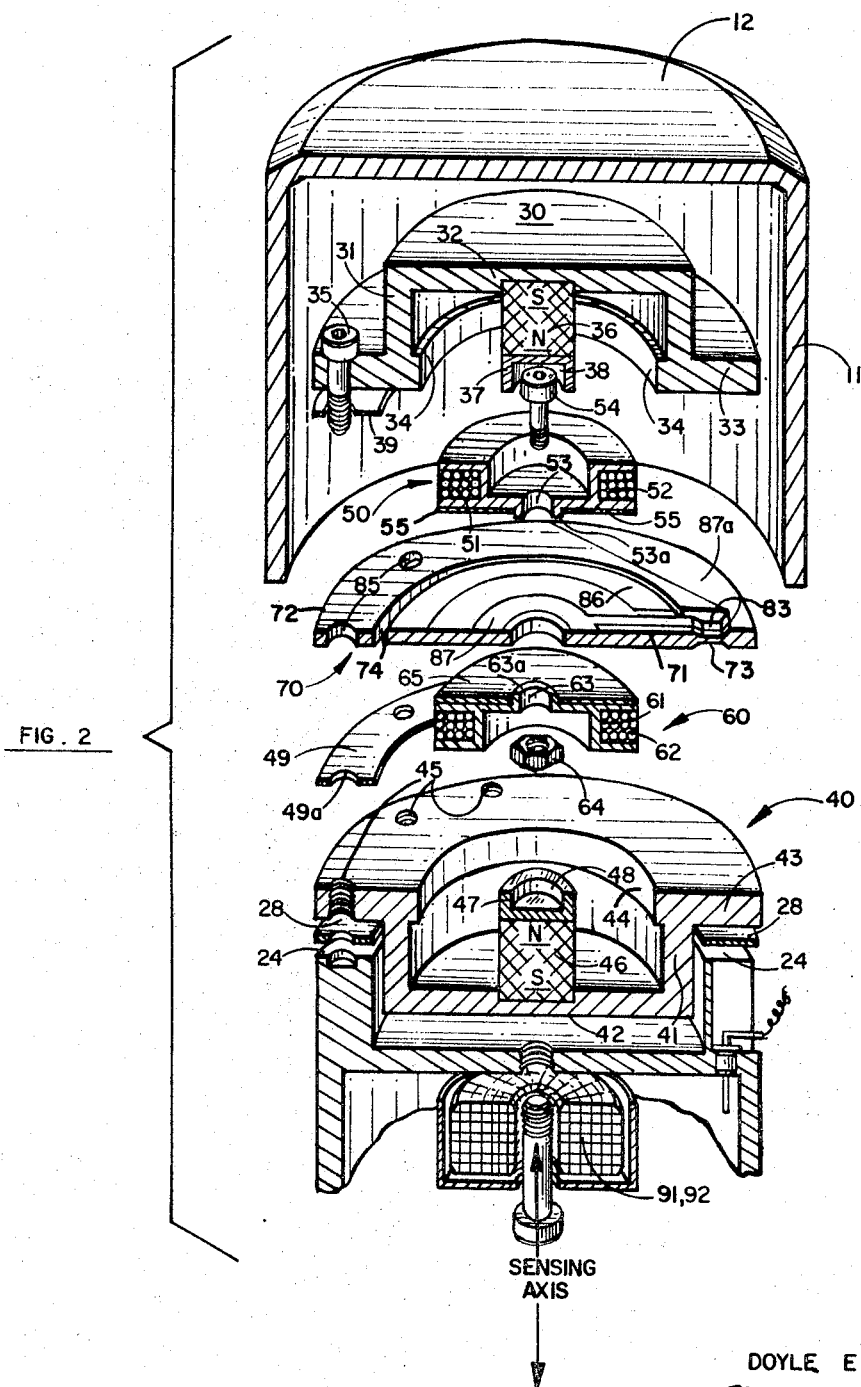
FIG. 2 illustrates a cross-sectional isometric layout taken along lines 2—2 of FIG. 1.
Figure 1:
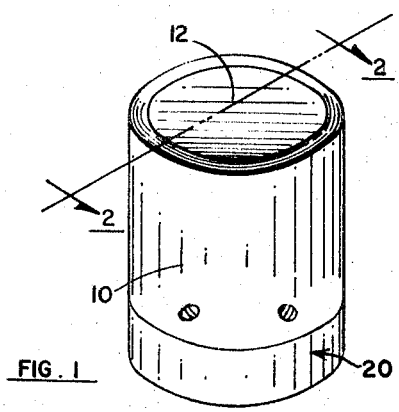
FIG. 1 illustrates an outer isometric view of an accelerometer embodying the invention.
Figure 3:
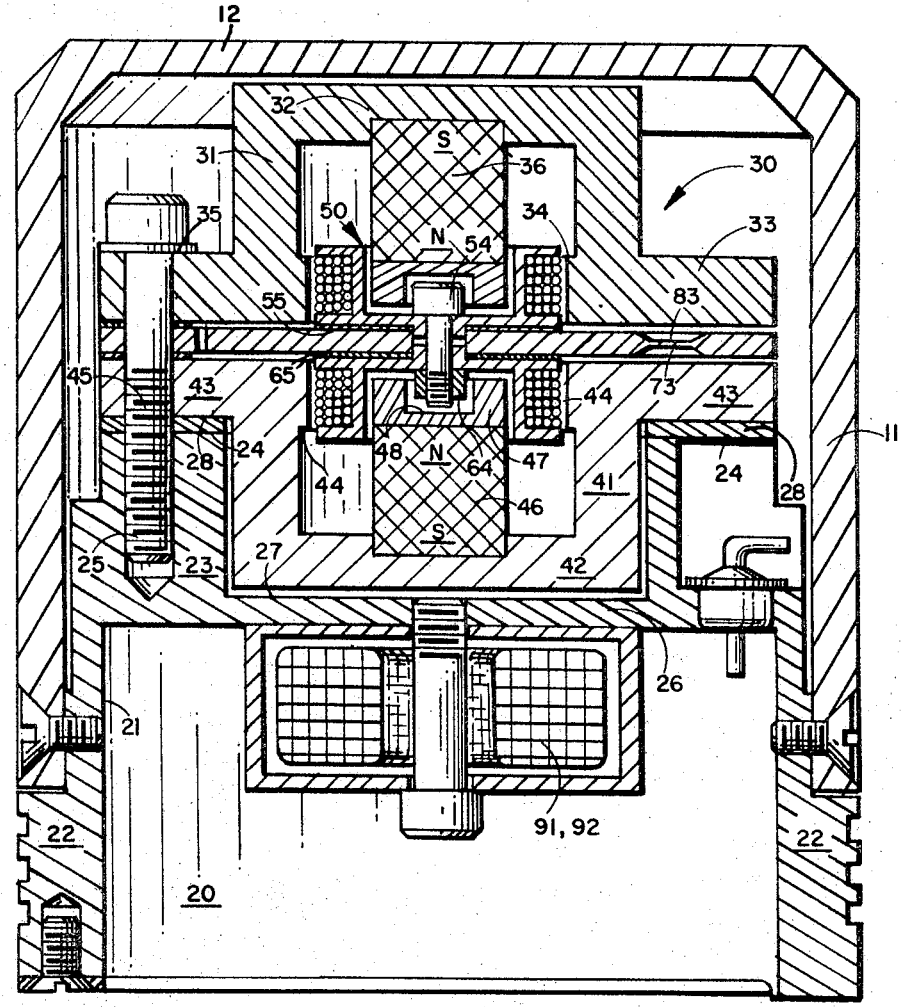
FIG. 3 illustrates a cross-sectional elevation view of the accelerometer illustrated in FIGS. 1 and 2.

An accelerometer embodying the invention is illustrated in the drawings and includes an upper housing portion 10 and a lower housing portion 20, shown in FIGS. 1 to 3. The upper housing portion 10 includes a right circular cylinder having a cylindrical side wall 11 and a right planar end 12. The lower portion 20, as shown in FIG. 3, includes a lower cylindrical portion 22 having an outer diameter equal to the outer diameter of cylinder walls 11. Extending upwardly from cylinder walls 22 is a cylindrical portion 21 having an outer diameter slightly less than the inner diameter of the cylindrical sides 11. The upper portion of the cylinder portion 21 includes a cylindrical flange portion 23 providing an upper ring shaped surface 24 which is planar and horizontally disposed. The upper circular cylindrical portion 23 defines a cylindrical recess 27 having a lower horizontally disposed circular bottom 26. Extending downwardly through the surface 24 and cylindrical flange section 23 are a plurality of vertically disposed threaded apertures 25. A ring shaped electrical insulating gasket 28 is placed on the upper circular surface 24 and has a plurality of apertures therein positioned over corresponding apertures 25 in flange 23.

The embodiment illustrated in FIGS. 1–5 is an accelerometer utilizing a cantilevered proof mass which is electromagnetically torqued to maintain the proof mass substantially undeflected with respect to environment in the presence of acceleration. A first air gap-pickoff member is mounted in the housing and includes a magnetically and electrically conductive top hat member 30 having cylindrical side walls 31 with a perpendicular cover or top 32 at one end, and a perpendicular circular ring or flange 33 at the other end. Flange 33 has a circular shoulder portion 34 extending inwardly of the cylindrical side wall 31. Mounted on, concentric with and on the inner side of, the circular cover 32 is a cylindrically shaped permanent magnet 36 having the polarity as indicated. Extending downwardly, as shown in FIG. 2, from the permanent magnet 36 is a cylindrical pole piece 37 having a cylindrical recess 38 at the free end thereof.

A second air gap-pickoff member is shown as an inverted top hat member 40 including cylindrical side walls 41 having a perpendicular circular bottom 42 at one end and a ring shaped circular flange 43 at the other end. The bottom 42 and the flange 43 are parallel to each other and are transverse to the cylindrical walls 41. The flange 43 has an inner circular flange or shoulder portion 44 transverse to and extending inwardly of the inner wall 41. Mounted on, concentric with, and perpendicular to, the inner surface of member 42 is a cylindrically shaped permanent magnet 46. This magnet has the polarity as indicated in the drawing with the end secured to the inner surface of 42 being South and the other end being North. Secured to and extending concentric with magnet 46 is a cylindrical pole piece 47 having a circular recess 48 therein. Thus, it is seen that the member 30 provides a circular air gap between pole piece 37 and the inwardly extending circular flange pole piece 34. The member 40 is magnetically conductive and provides a circular air gap between the pole piece 47 and the pole piece flange 44.

The flange 43 has cylindrical apertures 45 extending therethrough and defining a semicircle. The flange 33 has cylindrical apertures 35 positioned concentric with corresponding apertures 45 and also describing a semicircle. These apertures are adapted to receive a threaded bolt 35 which is made of an electrical insulating material.

Figure 4:
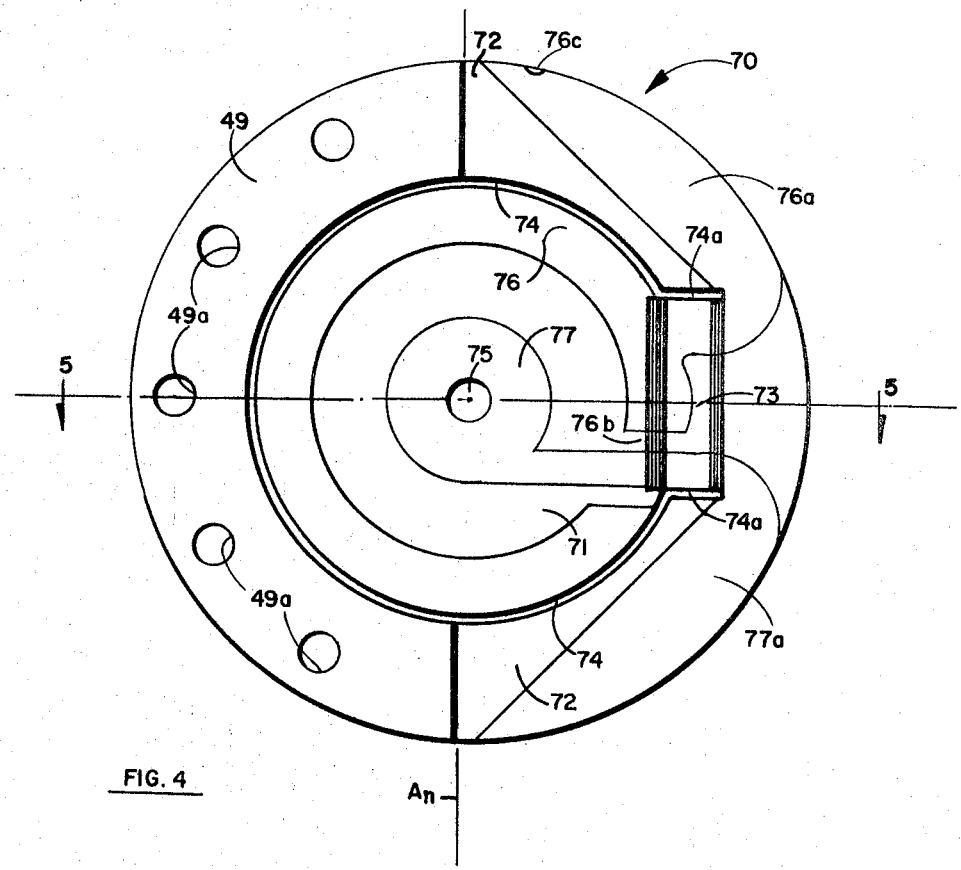
FIG. 4 illustrates a bottom view of the proof mass and the mounting means for the proof mass illustrated in FIGS. 2 and 3.

FIG. 4 taken with FIG. 2 illustrates the proof mass and its mounting means. As shown in FIG. 4, the proof mass disc assembly 70 includes a circular ring shaped base member 72 having apertures 85 therein. The inner circular peripheral edge of the base member 72 is defined by an inner circular slot 74 extending transversely through the disc 70. As shown in FIG. 4, the circular slot 74 completes less than a circle and terminates in two parallel slots 74a extending outwardly toward the peripheral edge of and transversely through disc 70. Between the grooves 74a, as shown in FIGS. 3 and 4, is a rectangular grooved portion in 73 in one side and another rectangular grooved portion 83 on the opposite side to provide a required degree of flexure for the proof mass. The circular groove 74 defines a circular disc 71 which is part of the proof mass. As shown in FIG. 4, a circular conductive strip 76 is mounted on the outer edge of disc 71 and is electrically connected to a leadout conductive strip 76a, shown as a half-moon portion and mounted on the surface of the circular base of rim 72. In the center of the proof mass 71 is a circular aperture 75 concentric with disc 71. On the disc 71 adjacent aperture 75 is a circular conductor strip 77 which is concentric with aperture 75 and with outer conductor 76. The outer conductor 76 completes less than a circle so as to define a portion 76b between two ends thereof. Through this portion 76b a conductor electrically connects inner conductor 77 to an output terminal 77a. The assembly 70 is made of fused silica, and an electric insulator. The conducting portions 76, 76a, 77 and 77a are gold which is plated on the silica. The fused silica has low thermal expansion and low loss elastic properties desirable for a proof mass.

Thus the portions 76, 76a, 77, and 77a are the only electrically conductive portions on one side of the disc 70. In addition, portions 77 and 77a are electrically insulated from 76 and 76a.

Conductors are located on the opposite side of the disc 70 and are the projection of the conductors 77, 77a, 76 and 76a. This is more clearly shown in FIG. 2. More specifically a complete top view of the disc 70 would be a mirror image of the FIG. 4. The capacitive leadout 76a is electrically connected to the corresponding capacitive leadout on the opposite side of the disc so as to be electrically connected to the capacitive circular conductor strip 86 which is the mirror image of conductor strip 76. This is done by way of a conductor 76c on the peripheral edge of the base 72. Strip 86 is located on the peripheral edge of mass 71. Conductors 76 and 86, which are electrically connected, operate on the proof mass 71 as the movable capacitive plate in a pickoff bridge. The inner conductive layers 77 and 87, the mirror image of conductor 77, are leads for voice coils.

A voice-coil assembly 50 includes a circular channel member made of an electrical insulating material and having a rectangular shaped circularly disposed recess 51 on the outer periphery thereof. Mounted in recess 51 is a circular forcing voice coil 52. An aperture 53 located in assembly 50 is concentric with the outer periphery of the voice coil and has a circular flange 53a for insertion into aperture 75 of disc 70.

Figure 5:
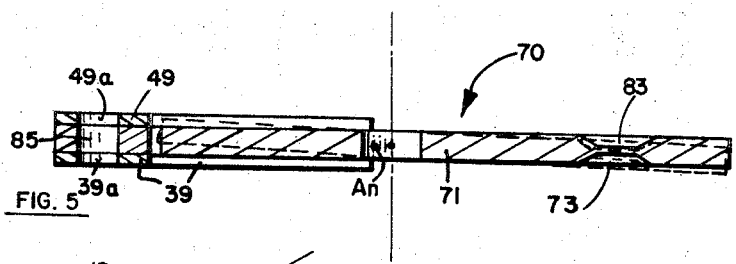
FIG. 5 is a cross-sectional elevation view taken along lines 5—5 in FIG. 4.
Figure 6:
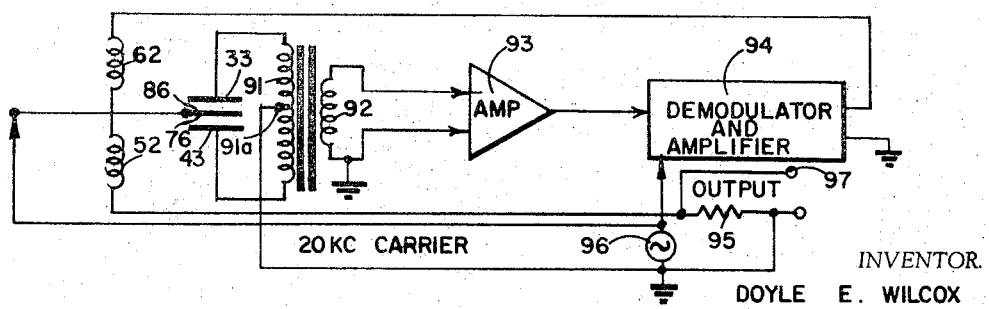
FIG. 6 illustrates a schematic diagram in block form of a servo utilized in the embodiment illustrating FIGS. 1–5.

A second voice-coil assembly 60 has a circularly disposed rectangularly shaped recess 61 within which a circularly disposed forcing voice coil 62 is mounted. This circular voice coil support is made of an electrical insulating material. Concentric with the voice coil and recess 62 and 61 is an upwardly extending aperture 63 having a circular flange portion 63a for insertion into the opposite side of aperture 75. An electrical conducting bolt 54, as shown in FIG. 3, is inserted through aperture 53, aperture 75 and aperture 63 and is secured to an electrical conducting nut 64 to provide an assembly as shown in FIG. 3. This securely mounts both assemblies 50 and 60 on the disc 70. Mounted between assembly 50 and conductor 87 is a circular conducting member 55 as shown in FIGS. 2 and 3. One lead of voice coil 52 is connected to member 55 so as to provide an electrical connection between voice coil 52 and the conductive strips 87 and 87a. The other lead of coil 52 is connected to bolt 54. A similar circular conducting member 65 electrically connects one lead of coil 62 to conductive layers 77 and 77a. The other lead of voice coil 62 is connected to nut 64 to provide the series connection for coils 52 and 62 shown in FIG. 5. The conductor 87a is connected to output terminal 97 whereas the conductor 77a is connected to demodulator and amplifier 94 to provide the other two voice coil connections as shown in FIG. 6. Thus, portions 77a and 87a operate as voice-coil leadouts for the two series connected voice coils.

In the assembled position, the voice-coil 52 extends upwardly into the circular air gap defined by pole piece 37 and pole piece flange 34 while the head of the bolt 54 extends upwardly into recess 38. In the assembly position, the voice coil 62 extends downwardly into the circular voice coil air gap defined by pole piece 47 and pole piece flange 44. The voice coils 52 and 62 are wound so that when viewing FIG. 3, the current is in the same direction in both voice coils (i.e., left to right or right to left). Current in one direction passing through the series connected voice coils 52 and 62 results in the proof mass being torqued, for example, upwardly as shown in FIG. 3 whereas current in the opposite direction will result in torquing of the proof mass 71 downwardly as shown in FIG. 3.

In the assembled position shown in FIG. 3, a semicircular shaped spacer or shim 49 is connected between the flange 43 and slightly less than 180° of one side of base member 72 as illustrated in FIG. 4. A similar spacer member 39 is positioned between flange 33 and base 72. Apertures 39a in shim 39 are co-axial with apertures 35, 85, 49a, 45, 25 and apertures in gasket 28. When assembled bolts are placed in these apertures with at least apertures 25 being threaded to mount the assembly on flange 33, these bolts are electrical insulators as is the gasket 28. Spacers 39 and 49 are insulators, both are juxtaposition, and have identical shapes as shown in FIG. 5. The ends of shims 39 and 49 effectively define a neutral axis $A_n$ as shown in FIGS. 4 and 5. As will be seen from the drawing and above description, the assembly 70 has no supporting or bearing surfaces other than those defined by the semi-circular spacers 39 and 49. The bearing surface afforded by these spacers, as can be seen from FIGS. 4 and 5, are restricted to a semi-circular portion of the base 72. As a result, as shown in FIG. 5, the proof mass 71 is thereby free to rotate upwardly through the aperture defined by the slot 74 and about the cantilevered connection defined by portions 83 and 73.

As can be observed clearly in FIGS. 4 and 5, the axis $A_n$ defined by the ends of shims 39 and 49 does not pass through the center of proof mass 71 but rather intersects less than 180° of the periphery of 71. The axis $A_n$ is off-center because ring 76 has a cutout section and more than one-half of the surface area of ring 76 would be on one side of axis $A_n$ if the axis intersected the center of the ring. The plane (including $A_n$) defined by the ends of 39 and 49 divides the conducting surface 76 into two sections of substantially equal area. Likewise, this plane divides surface 86 into sections of substantially equal area. The inner diameter of 76 and 86 is equal to or slightly greater than the inner diameter of flanges 34 and 44 and concentric therewith. Large acceleration forces can occur which have components which act substantially parallel to the contacting surfaces of base 72 and the shims 39 and 49 and substantially perpendicular to the axis $A_n$. This causes shear forces which effect relative motion that is taken up in the fused silica material of base 72. When these forces occur, the base 72 and mass 71 tends to cant about neutral axis $A_n$ as shown in FIG. 5.

The pickoff is, as shown in FIG. 6, of a capacitive bridge type. In the preferred embodiment shown the upper circular flange 33 with circular conductor 86 provide a first capacitance, whereas the lower flange 43 operates with the conductor 76 to provide the second capacitance. In a second embodiment the voice coil assembly 50 and the pole piece flange 37 provide a first capacitance with the voice coil assembly 60 and the pole piece flange 44 providing a second capacitance. Hence when the proof mass 71 is canted about the axis $A_n$ permanently, the effect on the two capacitance described above by this deformation, will be minimized. More specifically when such a deformation occurs, the capacitance of one portion of the conductor 76 may increase with respect to flange 43 but due to the pivotal action about $A_n$, the other equal portion of conductor 76 will decrease capacitance with the flange 43. Since these two portions of conductor 76 are substantially equal in area, the total net change in capacitance will for many such deformations be negligible. The same holds true for changes in capacitance between flange 33 and conductor 86.

FIG. 6 illustrates the torquing servo mechanism in block form. As shown in FIG. 6, if the proof mass 71 tends to pivot about the stem defined by recesses 73 and 83, toward or away from flange 33, the bridge defined by the center tapped primary 91 of the balancing transformer will be unbalanced. More specifically, a carrier oscillator 96 is connected between conductors 76 and 86 and the primary center tap 91a of the balancing transformer. Hence if the capacitance between conductor 86 and flange 33 and conductor 76 and flange 43 tends to change, there will be an output in the secondary 92 of the balancing transformer. This output will be applied to the amplifier 93 and thence to a demodulator and amplifier 94. The oscillator 96 is connected to demodulator 94 to provide a reference for demodulating the output of amplifier 93. The output of 94 provides a torquing current through the series connected coils 52 and 62. This torquing current is also applied to a readout load 95 having output terminals 97 for reading out the required torque to maintain the proof mass undeflected. This current is a measure of the acceleration applied to the accelerometer.

When the capacitive conductors 86 and 76 are moved by acceleration about the stem portion defined by recesses 73 and 83, so as to change capacitance with flanges 33 and 43, a current will be provided to the voice coils 52 and 62 from 94 of a polarity and amplitude so as to provide a torque to the proof mass 71 to maintain the proof mass substantially undeflected with respect to its environment.

Since the servo in FIG. 6 is a conventional type restored servo, the details thereof will not be described in the present application.

It will be noted that the magnetic assemblies 30 and 40 operate as pole pieces and also as an A-C pickoff current path. By so doing, a substantial saving in space and weight is achieved. It will be understood that such a saving in weight can be highly important in missiles and aircraft. Being basically only a three piece construction (i.e., assembly 70 includes the two voice coils, together with assembly 30 and the assembly 40) uniform fabrication of the accelerometer in large scale production can be achieved.

It will be noted that preferably the voice coils are of the same dimensions and winding so as to exert equal electromagnetic forces. In addition, the shims 39 and 49 are preferably symmetrical about grooved portions 73 and 83 as shown in FIG. 4. Further, the ends of shims 39 and 49 are transverse to the direction of slots 74a, as shown in FIG. 4. Consequently, the neutral axis $A_n$ is parallel to the axis of rotation (or freedom of rotation defined by slots 74a and portions 73 and 83).

Although the invention has been described and illustrated in detail, it is to be clearly understood that this is by way of illustration and example only with the spirit and scope of the invention being limited only by the terms of the appended claims.

I claim:

1. an accelerometer comprising a support means, a base member cantilevered from said support means at a central portion of said base member and in a first direction, a proof mass cantilevered from said base member in an opposite direction and extending beyond said central portion, pick-off means having a first part mounted on said proof mass and a second part mounted on said support means, substantially one-half of each of said parts being located on each side of said central portion, and servo means torquing said proof mass in response to acceleration signals from said pick-off means so as to maintain said proof mass undeflected with respect to its environment.

2. An accelerometer comprising a support means, a circularly disposed base member cantilevered from said support means in a first direction, said base member having an aperture therein, and a proof mass cantilevered from said base member in an opposite direction within said aperture, pick-off means having a first part mounted on said proof mass and a second part mounted on said support means, substantially one-half of each of said parts being located on opposite sides of the center of said proof mass.

3. An accelerometer comprising a support means, a circularly disposed base member having an outer rim and an inner circular aperture, cantilevered from said support means by said outer rim at a central portion of said base member, a circular proof mass cantilevered on said outer rim extending into said aperture beyond said central portion, pick-off means having a first part mounted on said proof mass and a second part mounted on said support means, substantially one-half of each of said parts being located on each side of said central portion.

4. An accelerometer as set forth in claim 3 wherein said proof mass includes a circular disc, a first voice-coil mounted on one side of said circular disc and a second voice coil mounted on the opposite side of said disc and servo means responsive to said pick-off means actuating said voice coils so as to maintain said proof mass undeflected with respect to environment.

5. An accelerometer comprising a support means, a base member mounted on said support means and having a cantilever connection with said support which defines an axis located centrally of said base and substantially parallel to a major surface thereof, said base member having an aperture therein, a proof mass cantilevered within said aperture toward said support, and said axis intersecting said aperture and said proof mass centrally thereof, pick-off means having a first part mounted on said proof mass and a second part mounted on said support means, substantially one-half of each of said parts being located on each side of said defined axis.

6. An accelerometer comprising a support means, a circularly disposed base member cantilevered from said support means in a first direction, said base member having a circular aperture therein, a circcular disc cantilevered from said base member in an opposite direction within said aperture, said disc member having an outer circular conductor element on the periphery thereof, means including said circularly disposed conductor and said support means responsive to variations of capacitance between said conductor and said support means to maintain said disc undeflected with respect to its environment.

7. An accelerometer as set forth in claim 6 wherein a voice-coil is mounted on said circular disc, said support means including a first magnetic conductor and a second magnetic conductor forming an air-gap for said voice-coil, said first magnetic conductor forming an alternating current path with said outer circular conductor, servo means responsive to a variation of capacitance between said first magnetic conductor and said circular conductor to actuate said voice-coil and apply a restoring torque to said circular disc.

8. An accelerometer comprising a support means including a first cylindrical member and a second cylindrical member, a ring-shaped base member having a semi-circular portion secured between said first circular member and said second circular member to provide a cantilevered mounting thereof, said base member defining a circular aperture, a circular disc cantilevered from said base member in said aperture toward said mounting portion, said first cylinder member defining a first circular air-gap at one side of said disc, said second cylinder member defining a second circular air-gap at the opposite side of said disc, a first circular voice-coil mounted on a first side of said disc and extending into said first air-gap, a second circular voice coil mounted on the opposite side of said disc and extending into said second air-gap, conductor means extending around the periphery of said disc on said first side and on said opposite side of said disc so as to form an alternating current path between said first cylinder pick-off means having a first part mounted on said disc and a second part mounted on said support means, substantially symmetrical with the center of said disk, said first and said second conductors and said second cylinder, and servo means responsive to said pick-off means for varying the current through said first and said second voice-coils to thereby maintain said disc substantially undeflected with respect to its environment.

References Cited
UNITED STATES PATENTS 2,089,745  8/1937  Graf _____ 73—382
2,959,459  11/1960  Ryan _____ 73—516 X JAMES J. GILL, *Primary Examiner.*